US007020727B2

(12) United States Patent
Tufford et al.

(10) Patent No.: US 7,020,727 B2
(45) Date of Patent: Mar. 28, 2006

(54) FULL-SPAN SWITCHED FABRIC CARRIER MODULE AND METHOD

(75) Inventors: Robert C. Tufford, Chandler, AZ (US); Jeffrey M. Harris, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 49 days.

(21) Appl. No.: 10/854,818

(22) Filed: May 27, 2004

(65) Prior Publication Data

US 2005/0268009 A1    Dec. 1, 2005

(51) Int. Cl.
*G06F 13/38* (2006.01)
*G06F 13/00* (2006.01)

(52) U.S. Cl. ........................ 710/301; 710/100
(58) Field of Classification Search ............... 710/300, 710/301, 100, 302; 361/735, 748, 784
See application file for complete search history.

(56) References Cited

U.S. PATENT DOCUMENTS

| | | | | |
|---|---|---|---|---|
| 6,155,842 | A * | 12/2000 | Baitz | 439/61 |
| 6,351,786 | B1 * | 2/2002 | Elmore et al. | 710/303 |
| 6,533,587 | B1 * | 3/2003 | Potter et al. | 439/65 |
| 6,646,890 | B1 * | 11/2003 | Byers et al. | 361/802 |
| 6,751,699 | B1 * | 6/2004 | Langley et al. | 710/317 |
| 6,771,846 | B1 * | 8/2004 | Byers et al. | 385/14 |
| 6,805,560 | B1 * | 10/2004 | Budny et al. | 439/65 |
| 6,822,876 | B1 * | 11/2004 | Goergen | 361/788 |

* cited by examiner

*Primary Examiner*—Glenn A. Auve
*Assistant Examiner*—Trisha Vu
(74) *Attorney, Agent, or Firm*—Kevin D. Wills

(57) ABSTRACT

A multi-service platform system (100) includes a switched fabric backplane (102), a baseboard (104) coupled to interface with the switched fabric backplane, a full-span switched fabric carrier module (106) coupled to interface with the baseboard, and a switched fabric link (108), wherein the full-span carrier interfaces with the baseboard via the switched fabric link.

19 Claims, 4 Drawing Sheets

FULL-SPAN SWITCHED FABRIC CARRIER MODULE AND METHOD

BACKGROUND OF THE INVENTION

Expansion cards can be added to computer systems to lend additional functionality or augment capabilities. Current expansion cards interface and communicate with computer systems using primarily parallel multi-drop bus network architectures, such as Peripheral Component Interconnect (PCI) or VERSAmodule Eurocard (VMEbus). Parallel multi-drop bus architectures have the disadvantage that they can only be used to support one instantaneous communication between modules in a computer system or network. However, some applications have requirements for simultaneous high-bandwidth transfers between modules that cannot be handled by a parallel multi-drop bus architecture.

In the prior art, expansion cards, particularly mezzanine cards, are placed on payload modules mounted in chassis-type computer systems, such as VMEbus type systems known in the art. However, the prior art does not support the addition of mezzanine cards that support high-speed data transfers outside of the parallel multi-drop bus network. It is desirable to add additional functionality to a baseboard in a chassis-type computer network that can communicate using high-speed communications protocols. It is also desirable to add additional functionality to an individual baseboard through mezzanine cards beyond that which the limited real estate of a baseboard permits. Therefore, it is desirable to provide expansion cards in a chassis-type environment that support high-speed data transfers, while maximizing the real estate of each individual baseboard.

Accordingly, there is a significant need for an apparatus and method that overcomes the deficiencies of the prior art outlined above.

BRIEF DESCRIPTION OF THE DRAWINGS

Referring to the drawing.

Figure 1:
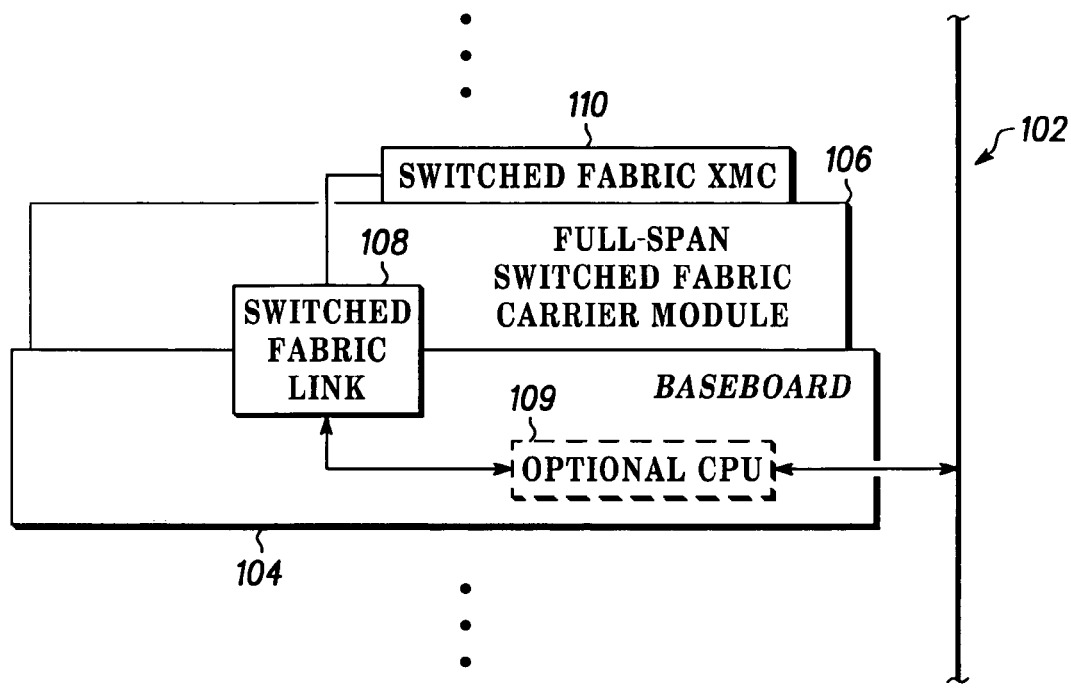
FIG. 1 depicts a multi-service platform system according to one embodiment of the invention.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings, which illustrate specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

FIG. 1 depicts a multi-service platform system 100 according to one embodiment of the invention. A multi-service platform system 100 can include one or more computer chassis, with software and any number of slots for inserting modules. Modules can add functionality to multi-service platform system 100 through the addition of processors, memory, storage devices, and the like. In one embodiment a backplane connector is used for connecting modules placed in the slots. In an embodiment, multi-service platform system comprises an embedded-type computer system having a chassis supporting a backplane and further comprising individual slots. Each slot is coupled for receiving a baseboard that plugs into the backplane. Each baseboard can add functionality to the overall multi-service platform system. For example, a baseboard can include processors, memory, storage devices, switches/routers, and the like. Each baseboard has a standardized form factor including physical dimensions, electrical connections, and the like as specified in an industry standard specification, for example VMEbus, VXS, ATCA, CompactPCI, and the like, as described further below.

As an example of an embodiment, a multi-service platform system 100 can include one or more chassis and modules conforming to the VERSAmodule Eurocard (VMEbus) switched serial standard backplane (VXS) as set forth in VITA 41 promulgated by VMEbus International Trade Association (VITA), P.O. Box 19658, Fountain Hills, Ariz., 85269. VXS includes a packet switched network, known as a switched fabric, on a switched fabric backplane 102. In the VXS environment, switched fabric backplane 102 can be coincident with a VMEbus parallel multi-drop bus.

In an embodiment, multi-service platform system 100 can be controlled by a platform controller (not shown for clarity), which can include a processor for processing algorithms stored in memory. Memory comprises control algorithms, and can include, but is not limited to, random access memory (RAM), read only memory (ROM), flash memory, electrically erasable programmable ROM (EEPROM), and the like. Memory can contain stored instructions, tables, data, and the like, to be utilized by processor. Platform controller can be contained in one, or distributed among two or more payload modules with communication among the various modules of multi-service platform system 100.

Switched fabric network operating on switched fabric backplane 102 can use a switch module as a central switching hub with any number of baseboards 104 coupled to switch module. Switched fabric network can be based on a point-to-point, switched input/output (I/O) fabric, whereby cascaded switch devices interconnect end node devices. Switched fabric network can include both module-to-module (for example computer systems that support I/O module add-in slots) and chassis-to-chassis environments (for example interconnecting computers, external storage systems, external Local Area Network (LAN) and Wide Area Network (WAN) access devices in a data-center environment). Switched fabric backplane 102 can be implemented by using one or more of a plurality of switched fabric standards, for example and without limitation, InfiniBand™, Serial RapidIO™, FibreChannel™, Ethernet™, PCI Express™, Universal Serial Bus (USB), Serial Advanced Technology Architecture (Serial ATA), Serial Attached Small Computer System Interface (Serial Attached SCSI), and the like. Switched fabric backplane 102 is not limited to the use of these switched fabric standards and the use of any switched fabric standard is within the scope of the invention.

In an embodiment, baseboard 104 can have a VMEbus board form factor. VMEbus form factor, including physical dimensions, electrical connections, and the like are known in the art and set forth in the ANSI/VITA 1-1994 and ANSI/VITA 1.1-1997 standards.

In another embodiment, baseboard 104 can have an Advanced Telecommunications Computer Architecture (ATCA™) form factor. In this embodiment, physical dimensions, electrical connections, and the like conform to ATCA standards. ATCA form factor, ATCA adaptor connector, ATCA connector interface, including physical dimensions, electrical connections, and the like, are set forth in the PCI Industrial Computer Manufacturers Group (PICMG) Specification 3.0.

In yet another embodiment, baseboard 104 can have a CompactPCI® form factor. In this embodiment, physical dimensions, electrical connections, and the like, conform to CompactPCI standards. Compact PCI form factor, CompactPCI adaptor connector, CompactPCI connector interface, including physical dimensions, electrical connections, and the like, are set forth in the CompactPCI Specification, by PCI Industrial Computer Manufacturers Group (PCIMG™), 301 Edgewater Place, Suite 220, Wakefield, Mass.

In an embodiment of the invention, switched fabric backplane 102 and baseboard 104 have a set of interlocking connectors designed to interlock with each other when baseboard 104 is placed in a slot of multi-service platform system 100. If the baseboard conforms to the VXS standard, the mechanical and electrical specifications for a portion of these interlocking connectors can be found in the ANSI/VITA 1-1994 and ANSI/VITA 1.1-1997 and the VITA 41 standards cited above for VMEbus systems. For example, these standards define the mechanical envelopes P0, P1 and P2 on baseboard 104, and corresponding mechanical envelopes J0, J1 and J2 on switched fabric backplane 102. Connectors in the P0/J0, P1/J1 and P2/J2 mechanical envelopes interlock when baseboard 104 is placed in a slot of multi-service platform system 100.

In this embodiment, baseboard 104 has switched fabric connector in the P0 mechanical envelope as defined in the VXS specification. Switched fabric backplane 102 can include corresponding switched fabric connector in the J0 mechanical envelope, where the switched fabric connector P0 and the corresponding switched fabric connector J0 are designed to interface and interlock when baseboard 104 is inserted into multi-service platform system 100. Switched fabric connector P0 and corresponding switched fabric connector J0 are designed for use in high-speed switched fabric networks and are compatible with any of a plurality of switched fabric standards discussed above. In an example of an embodiment of the invention, switched fabric connector in the P0 envelope and corresponding switched fabric connector in the J0 envelope can be a Tyco MultiGig RT connector manufactured by the AMP division of Tyco Electronics, Harrisburg, Pa. The invention is not limited to the use of the Tyco RT connector, and any connector capable of handling data using any of the plurality of switched fabric network standards is encompassed within the invention.

In another embodiment, baseboard 104 can conform to the ATCA standard cited above and include a switched fabric connector on baseboard 104 and a corresponding switched fabric connector in switched fabric backplane 102. In another embodiment, baseboard 104 can conform to the CompactPCI standard cited above and include a switched fabric connector on baseboard 104 and a corresponding switched fabric connector in switched fabric backplane 102.

In an embodiment, baseboard 104 can be coupled to, and interface with, full-span switched fabric carrier module 106 via switched fabric link 108. Full-span switched fabric carrier module 106 has substantially the same physical dimensions of baseboard 104, hence the label "full-span" switched fabric carrier module 106. Therefore, physical dimensions of full-span switched fabric carrier module 106 can be defined by any of the VMEbus, ATCA, CompactPCI standards above depending on the embodiment employed for baseboard 104.

Switched fabric link 108 can include any electrical or optical connection that allows baseboard 104 to communicate with full-span switched fabric carrier module 106 and any modules coupled to full-span switched fabric carrier module 106 using high-speed serial data communication. Particularly, communication can occur using any switched fabric standard as discussed above. In an example of an embodiment, switched fabric link 108 transfers data at least one gigabyte per second. In an embodiment, switched fabric link 108 can comprise an expansion connector, where the expansion connector is coupled to communicate and transfer data using a switched fabric standard. In one embodiment, switched fabric link 108 can be dedicated to communicating data using switched fabric standard. In another embodiment, switched fabric link 108 can include a connection means that includes other functions in addition to communicating data using switched fabric standard.

In an embodiment, full-span switched fabric carrier module 106 can be coupled to at least one mezzanine card. An exemplary mezzanine card can be a Common Mezzanine Card (CMC) having a CMC form factor. CMC form factor, including physical dimensions, electrical connections, and the like, are known in the art and set forth in the Institute of Electrical and Electronics Engineers (IEEE) standard P1386.

A particular example of an embodiment is a switched fabric enabled mezzanine card (XMC) 110. XMC's are described in VITA 42 promulgated by VMEbus International Trade Association (VITA), P.O. Box 19658, Fountain Hills, Ariz., 85269. Switched fabric enabled mezzanine card 110 can communicate using any high-speed serial communication means such as switched fabric standards. For example, switched fabric enabled mezzanine card 110 can communicate using any of the switched fabric standards cited above.

In an embodiment, switched fabric enabled mezzanine card 110 can be coupled to full-span switched fabric carrier module 106, where switched fabric enabled mezzanine card 110 is communicatively coupled to switched fabric backplane 102 and other modules in multi-service platform system 100 through full-span switched fabric carrier module 106 and baseboard 104. In other words, switched fabric enabled mezzanine card 110 is coupled to communicate with multi-service platform system 100 using switched fabric link 108 via baseboard 104 and full-span switched fabric carrier module 106.

In an embodiment, switched fabric enabled mezzanine card 110 is coupled to directly communicate with switched fabric backplane 102 and any other modules, baseboard, and the like in multi-service platform system 100. Directly communicate can mean that although switched fabric enabled mezzanine card 110 is coupled to full-span switched fabric carrier module 106 and indirectly to baseboard 104, neither full-span switched fabric carrier module 106 nor baseboard 104 control or manage switched fabric enabled mezzanine card 110. In effect, full-span switched fabric carrier module 106 and baseboard 104 can omit the use of any processors or buses to control or manage switched fabric enabled mezzanine card 110. In an embodiment, a switch module located elsewhere in multi-service platform system 100 can control switched fabric enabled mezzanine card 110 without any input from full-span switched fabric carrier module 106 or baseboard 104.

In this embodiment, full-span switched fabric carrier module 106 acts as a carrier module for switched fabric enabled mezzanine card 110. In other words, full-span switched fabric carrier module 106 acts merely as a connection point for switched fabric enabled mezzanine card 110 to physically interface with switched fabric backplane 102. In effect, switched fabric enabled mezzanine card 110 can be an independent node on switched fabric backplane 102.

In another embodiment, baseboard 104 can include an optional central processing unit (CPU) 109 that can control switched fabric enabled mezzanine card 110. In this embodiment, CPU 109 can control and manage one or more switched fabric enabled mezzanine cards 110 on full-span switched fabric carrier module 106. In another embodiment, full-span switched fabric carrier module 106 can include CPU 109 to operate and control one or more switched fabric enabled mezzanine cards 110.

Figure 2:
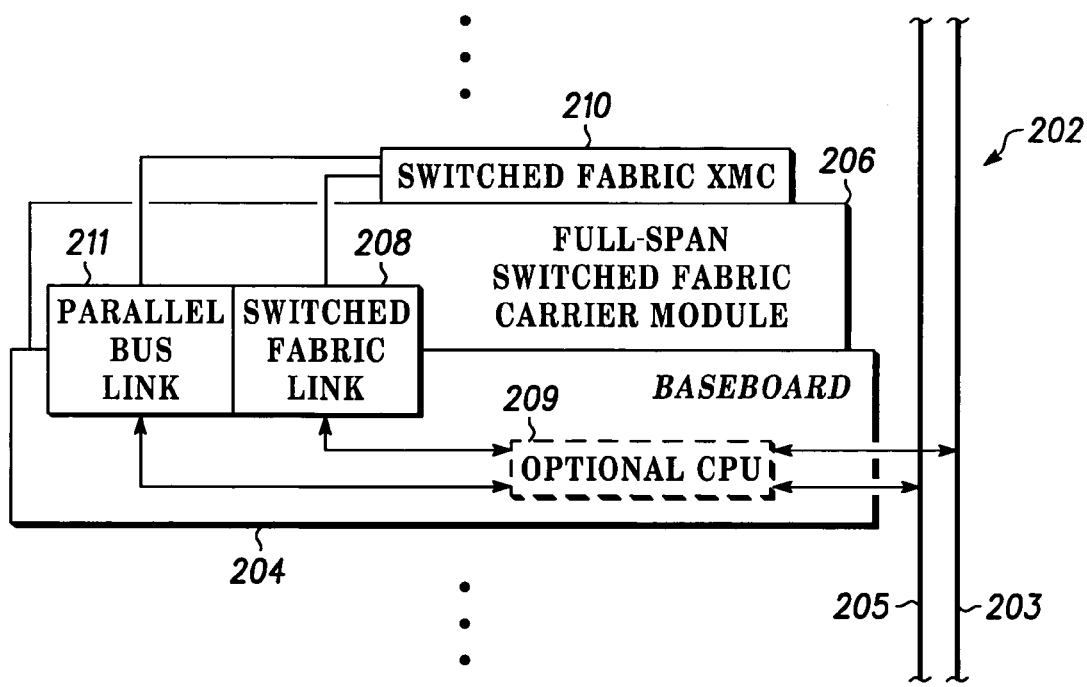
FIG. 2 depicts a multi-service platform system according to another embodiment of, the invention.

FIG. 2 depicts a multi-service platform system 200 according to another embodiment of the invention. Multi-service platform system 200 depicted in FIG. 2 functions substantially similar to the multi-service platform system discussed with reference to FIG. 1 with the addition of parallel multi-drop bus 205. In this embodiment, baseboard 204 conforms to the VXS standard as set forth above. In other words, switched fabric backplane 202 includes both switched fabric 203 and parallel multi-drop bus 205, for example a VMEbus network. In effect, switched fabric backplane 202 is a VXS backplane that can include hardware and software necessary to implement a coincident parallel multi-drop bus 205 and a switched fabric 203.

Parallel multi-drop bus 205 is known in the art. As an example, a VMEbus network is defined in the ANSI/VITA 1-1994 and ANSI/VITA 1.1-1997 standards, promulgated by the VMEbus International Trade Association (VITA), P.O. Box 19658, Fountain Hills, Ariz., 85269. In an embodiment of the invention, parallel multi-drop bus 205 can operate using parallel multi-drop bus standards, for example, VMEbus based protocols such as Single Cycle Transfer protocol (SCT), Block Transfer protocol (BLT), Multiplexed Block Transfer protocol (MBLT), Two Edge VMEbus protocol (2eVME) and Two Edge Source Synchronous Transfer protocol (2eSST). Parallel multi-drop bus 205 is not limited to the use of these VMEbus based protocols and other VMEbus based protocols are within the scope of the invention.

In an embodiment of the invention, switched fabric 203 and parallel multi-drop bus 205 operate concurrently within multi-service platform system 200. In an example of an embodiment, parallel multi-drop bus 205 can operate as a control plane by synchronizing and organizing activities in multi-service platform system 200. Switched fabric 203 can operate as a data plane by transferring data between individual baseboards or modules. In this embodiment, data is transferred faster through the higher bandwidth switched fabric 203, while the parallel multi-drop bus 205 controls and manages the overall system. This has the effect of increasing the speed of multi-service platform system 200 since data transfers that are in excess of parallel multi-drop bus 205 bandwidth can take place using switched fabric 203.

In another embodiment of the invention, parallel multi-drop bus 205 can be used as the data plane and switched fabric 203 can be used as the control plane. In yet another embodiment of the invention, parallel multi-drop bus 205 and switched fabric 203 each can operate as both the control plane and the data plane.

In the embodiment shown in FIG. 2, baseboard 204 conforms to the VXS standard and includes connectors in the P1/J1 and P2/J2 mechanical envelopes to couple baseboard 204 to parallel multi-drop bus 205 in switched fabric backplane 202, and switched fabric connector in the P0/J0 mechanical envelope to couple baseboard 204 to switched fabric 203 in switched fabric backplane 202.

In an embodiment, baseboard 204 can be coupled to, and interface with, full-span switched fabric carrier module 206 via switched fabric link 208. Switched fabric link 208 can include any electrical or optical connection that allows baseboard 204 to communicate with full-span switched fabric carrier module 206 and any modules coupled to full-span switched fabric carrier module 206 using high-speed serial data communication. Particularly, communication can occur using any switched fabric standard as discussed above. In an example of an embodiment, switched fabric link 208 transfers data at least one gigabyte per second. In an embodiment, switched fabric link 208 can comprise an expansion connector, where the expansion connector is coupled to communicate and transfer data using a switched fabric standard. In one embodiment, switched fabric link 208 can be dedicated to communicating data using switched fabric standard.

In another embodiment, switched fabric link 208 can include a connection means that includes other functions in addition to communicating data using switched fabric standard. For example, switched fabric link 208 can include parallel bus link 211. Both switched fabric link 208 and parallel bus link 211 can be included in, for example, the same connector. In another embodiment, parallel bus link 211 can be included in a separate connector from switched fabric link 208.

In an embodiment, full-span switched fabric carrier module 206 can include switched fabric enabled mezzanine card (XMC) 210 that only interfaces with switched fabric 203. In another embodiment, full-span switched fabric carrier module 206 can include switched fabric enabled mezzanine card 210 that interfaces and communicates with both switched fabric 203 and parallel multi-drop bus 205 (as shown). In this embodiment, full-span switched fabric carrier module 206 interfaces with baseboard 204 via parallel bus link 211 and switched fabric link 208. Switched fabric enabled mezzanine card 210 is coupled to communicate with multi-service platform system 200 using parallel bus link 211 via baseboard 204 and/or switched fabric link 208 via baseboard 204.

In an embodiment, switched fabric enabled mezzanine card 210 can interface with and communicate directly with multi-service platform system 200 as described above. In this embodiment, full-span switched fabric carrier module 206 and baseboard 204 do not control or manage switched fabric enabled mezzanine card 210. In another embodiment, baseboard 204 or full-span switched fabric carrier module 206 can include an optional CPU 209 to control and manage switched fabric enabled mezzanine card 210.

Figure 3:
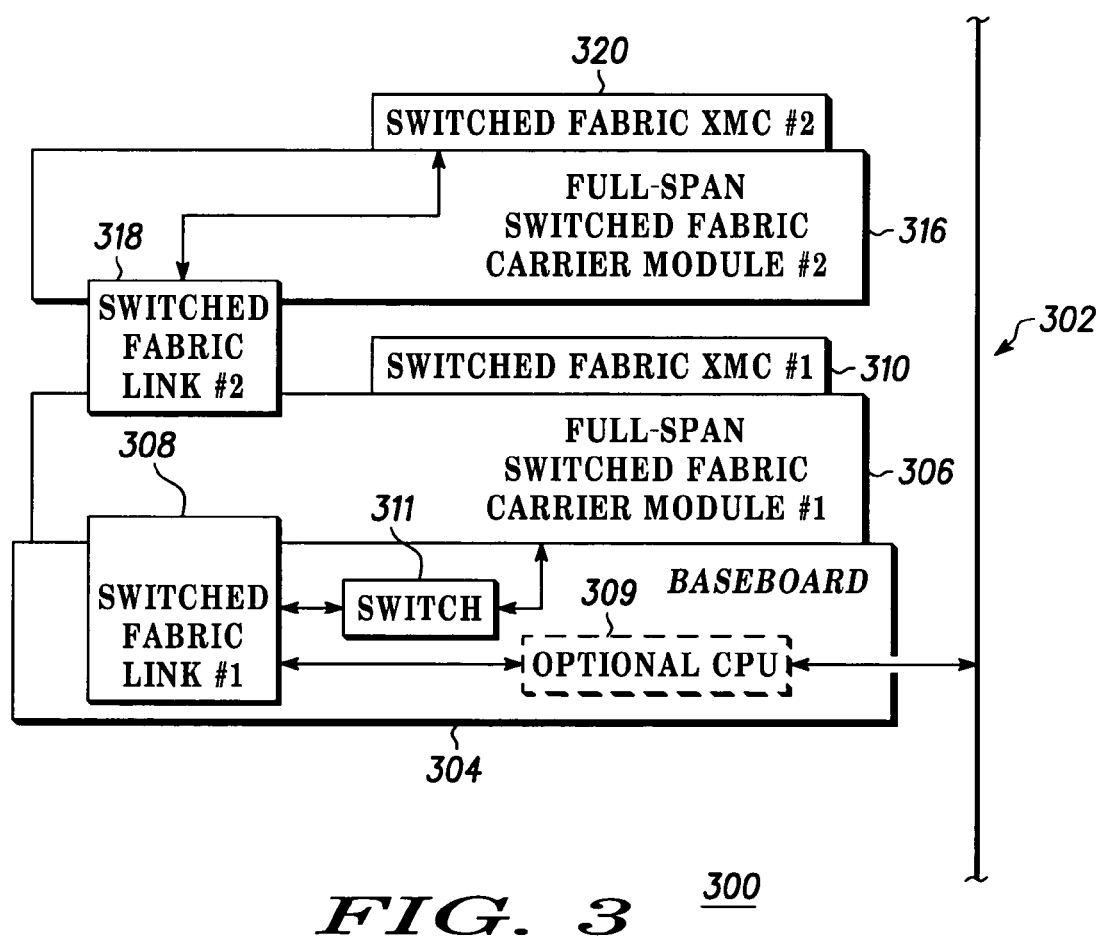
FIG. 3 depicts a multi-service platform system according to yet another embodiment of the invention.

FIG. 3 depicts a multi-service platform system 300 according to yet another embodiment of the invention. Multi-service platform system 300 depicted in FIG. 3 functions substantially similar to the multi-service platform system discussed with reference to FIG. 1. As shown in FIG. 3, second full-span switched fabric carrier module 316 is coupled to interface with full-span switched fabric carrier module 306 via second switched fabric link 318.

In an embodiment, baseboard 304 can be coupled to, and interface with, full-span switched fabric carrier module 306 via switched fabric link 308. Full-span switched fabric carrier module 306 has substantially the same physical dimensions of baseboard 304, hence the label "full-span" switched fabric carrier module 306. Therefore, physical dimensions of full-span switched fabric carrier module 306 can be defined by any of the VMEbus, ATCA, CompactPCI standards above depending on the embodiment employed for baseboard 304.

In the embodiment, second full-span switched fabric carrier module 316 has substantially the same physical dimensions of baseboard 304 and full-span switched fabric carrier module 306. Therefore, physical dimensions of second full-span switched fabric carrier module 316 can be defined by any of the VMEbus, ATCA, CompactPCI standards above depending on the embodiment employed for baseboard 304.

Second switched fabric link 318 can include any electrical or optical connection that allows baseboard 304 and full-span switched fabric carrier module 306 to communicate with second full-span switched fabric carrier module 316 and any modules coupled to second full-span switched fabric carrier module 316 using high-speed serial data communication. Particularly, communication can occur using any switched fabric standard as discussed above. In an example of an embodiment, second switched fabric link 318 transfers data at a rate of at least one gigabyte per second. In an embodiment, second switched fabric link 318 can comprise an expansion connector, where the expansion connector is coupled to communicate and transfer data using a switched fabric standard. In one embodiment, second switched fabric link 318 can be dedicated to communicating data using switched fabric standard. In another embodiment, second switched fabric link 318 can include a connection means that includes other functions in addition to communicating data using switched fabric standard.

In an embodiment, one or more switched fabric enabled mezzanine cards (XMC's) 320 can be coupled to second full-span switched fabric carrier module 316. In an embodiment, second switched fabric enabled mezzanine card (XMC) 320 can be coupled to second full-span switched fabric carrier module 316, where second switched fabric enabled mezzanine card 320 is communicatively coupled to switched fabric backplane 302 and other modules in multi-service platform system 300 through second full-span switched fabric carrier module 316, second switched fabric link 318, switched fabric link 308, and baseboard 304. In other words, second switched fabric enabled mezzanine card 320 is coupled to communicate with multi-service platform system 300 using second switched fabric link 318 via baseboard 304 and second full-span switched fabric carrier module 316.

In an embodiment, full-span switched fabric carrier module 306 can include switch 311, which can act as a router for switch fabric enabled mezzanine card 310 and second switch fabric enabled mezzanine card 320. Also, analogous to the embodiments depicted in FIGS. 1 and 2, baseboard 304 can include an optional CPU 309 to control and manage switch fabric enabled mezzanine card 310 and second switched fabric enabled mezzanine card 320. In another embodiment, switch fabric enabled mezzanine card 310 and second switched fabric enabled mezzanine card 320 can communicate directly with switched fabric backplane 302 through switch 311.

In an embodiment, any number of full-span switched fabric carrier modules can be "stacked" as depicted in FIG. 3. Also, any number of switched fabric enabled mezzanine cards can be coupled to each full-span switched fabric carrier module and be within the scope of the invention. Although not shown, any of full-span switched fabric carrier modules may be mechanically coupled to switched fabric backplane 302 to provide for mechanical stability, and the like.

In the embodiment depicted in FIG. 3, although not shown, a parallel multi-drop bus can be included analogous to that shown and described in FIG. 2. Any combination of switched fabric enabled mezzanine cards can be coupled to parallel multi-drop bus in a manner analogous to that shown in FIG. 2. Also, both switched fabric link 308 and second switched fabric link 318 can have parallel bus link included as shown in FIG. 2, where parallel bus link can be included in the same connector or in a different connector as switched fabric link 308 or second switched fabric link 318 respectively.

Figure 4:
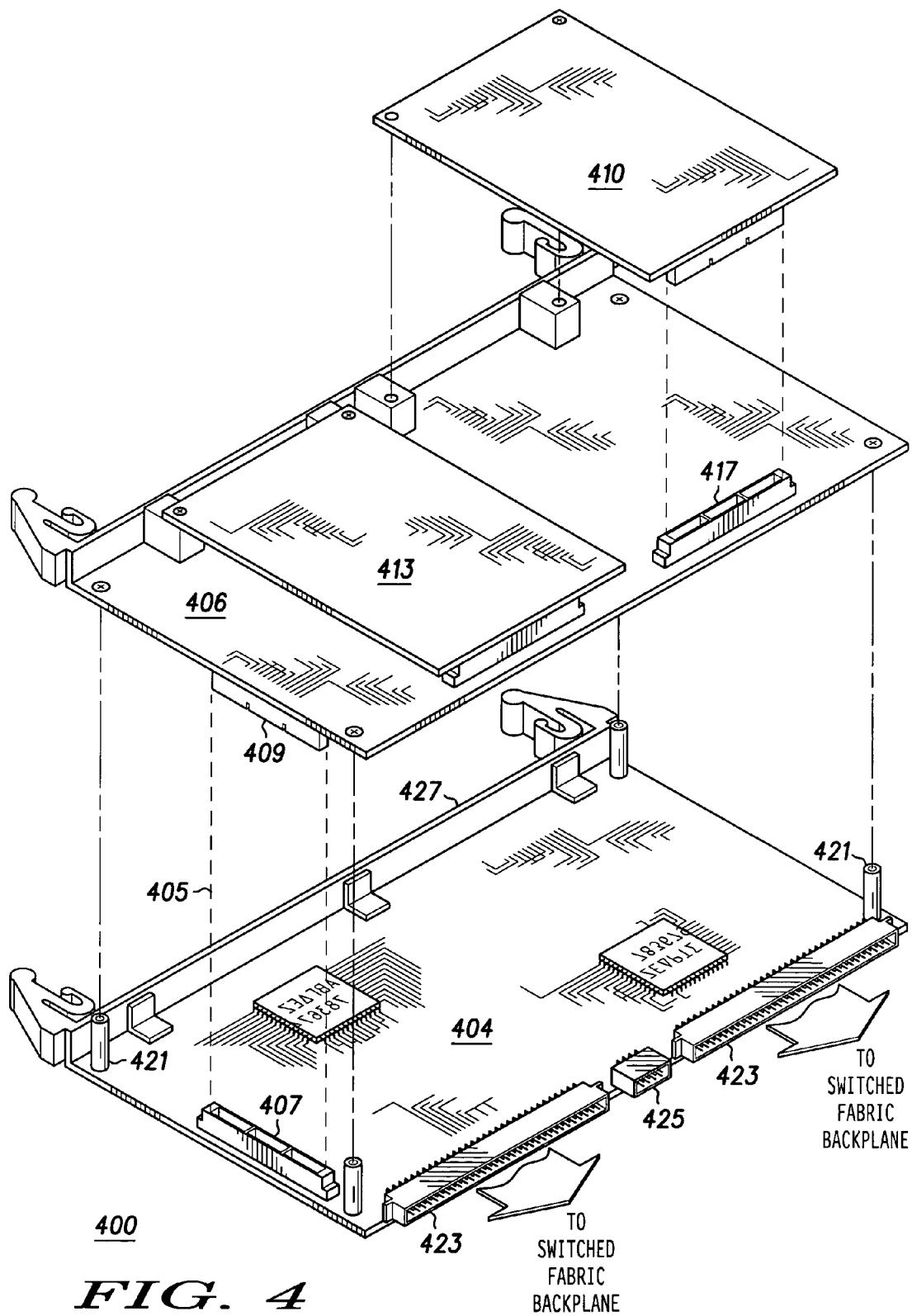
FIG. 4 depicts a multi-service platform system according to still another embodiment of the invention.

FIG. 4 depicts a multi-service platform system 400 according to still another embodiment of the invention. Shown in FIG. 4 is an isometric view of an exemplary embodiment of baseboard 404, full-span switched fabric carrier module 406 and switched fabric enabled mezzanine card 410, 413. Baseboard 404 depicted in FIG. 4 conforms to the VXS standard. However, baseboards that conform to ATCA and CompactPCI standards are within the scope of the invention.

As shown in FIG. 4, baseboard 404 includes connectors in the P1/P2 mechanical envelopes 423, and connector for switched fabric 425 in the P0 mechanical envelope. Connectors 423, 425 are coupled to interface with their corresponding connectors in the switched fabric backplane (not shown in FIG. 4). Full-span switched fabric carrier module 406 can be coupled to baseboard 404 using coupling means 421, for example screws, and the like. Any couplings means 421 is within the scope of the invention. Baseboard 404 also includes faceplate 427 to allow external connections to baseboard 404 and multi-service platform system 400. In an embodiment, full-span switched fabric carrier module 406 can also include a faceplate for coupling to external connections such as networking cables, data cables, optical ports, and the like.

Switched fabric link of FIGS. 1–3 can comprise expansion connector 405, where expansion connector 405 is coupled to communicate data using switched fabric standard. A first portion 407 of expansion connector 405 can be coupled to baseboard 404, while second portion 409 of expansion connector 405 can be coupled to full-span switched fabric carrier module 406. First portion 407 and second portion 409 are coupled to interface when baseboard 404 is coupled to full-span switched fabric carrier module 406. Expansion connector 405 can be any electrical, optical, and the like, connector capable of communicating data using any of switched fabric standards.

In an embodiment, expansion connector 405 can also communicate data using parallel multi-drop bus standard (through parallel bus link) such that data can be communicated through expansion connector simultaneously using switched fabric standard and parallel multi-drop bus standard. In another embodiment, data communicated using parallel multi-drop bus standard can be communicated using a connector separate from expansion connector 405.

As shown in FIG. 4, any number of switched fabric enabled mezzanine cards 410, 413 can be coupled to full-span switched fabric carrier module 406. As an example, full-span switched fabric carrier module 406 can comprise at least one switched fabric enabled mezzanine card connection site 417 for coupling switched fabric enabled mezzanine card 410 to full-span switched fabric carrier module 406. Switched fabric enabled mezzanine card connection site 417 can be include any type of electrical or optical connector to interface switched fabric enabled mezzanine card 410 to full-span switched fabric carrier module 406. Full-span switched fabric carrier module 406 can also include standard parallel multi-drop bus connection sites (not shown for clarity), which are known in the art, so that switched fabric enabled mezzanine cards 410, 413 can communicate with parallel multi-drop bus on switched fabric backplane. In an embodiment, switched fabric enabled mezzanine card connection site 417 can be independent of parallel multi-drop bus connection sites, by being a separate connector. In another embodiment, switched fabric enabled mezzanine card connection site 417 can be integral with a parallel multi-drop bus connection site. The scope of the invention is not limited by these switched fabric enabled mezzanine card connection site embodiments, and other embodiments that occur to those skilled in the art are within the scope of the invention.

In an embodiment, full-span switched fabric carrier module 406 can include a second switched fabric link such that a second full-span switched fabric carrier module can be coupled to full-span switched fabric carrier module 406. This illustrates the concept of "stacking" full-span switched fabric carrier modules off of baseboard 404. Any number of full-span switched fabric carrier modules can be "stacked" off of baseboard 404 and off of either surface of baseboard 404. For example, the underside of baseboard 404 depicted in FIG. 4 can include another switched fabric link such that one or more full-span switched fabric carrier modules can be "stacked" off of the underside as well. Although not shown, any full-span switched fabric carrier module can include connectors in the P0/P1/P2 mechanical envelopes for coupling to switched fabric backplane. In an embodiment, full-span switched fabric carrier module 406 can couple to switched fabric backplane for mechanical stability of the "stacked" boards in the multi-service platform system chassis.

Figure 5:
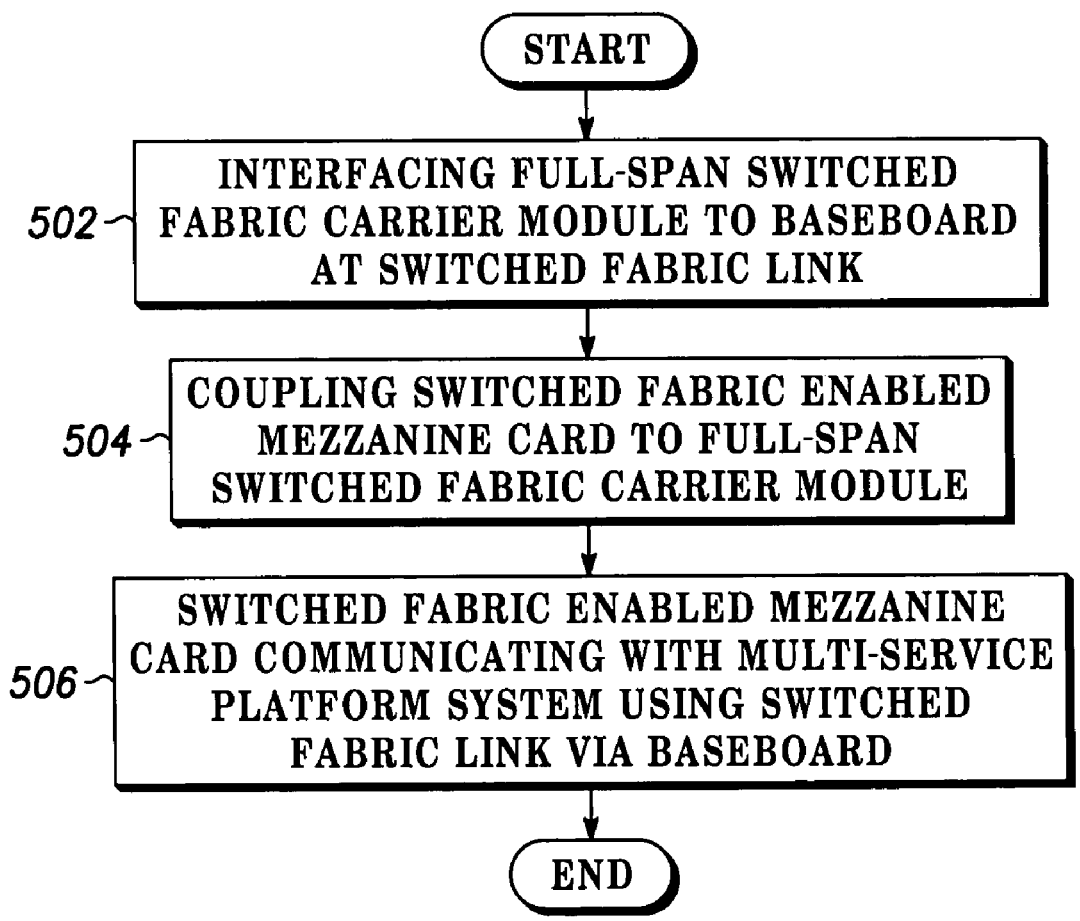
FIG. 5 illustrates a flow diagram of a method according to another embodiment of the invention.

FIG. 5 illustrates a flow diagram of a method according to another embodiment of the invention. Step 502 includes interfacing full-span switched fabric carrier module to baseboard at switched fabric link. Step 504 includes coupling switched fabric enabled mezzanine card to full-span switched fabric carrier module. Step 506 includes switched fabric enabled mezzanine card communicating with the multi-service platform system using the switched fabric link via the baseboard. In an embodiment, data is communicated through switched fabric link using a switched fabric standard. In another embodiment, switched fabric link comprises expansion connector, where data is communicated through expansion connector using switched fabric standard. In yet another embodiment, expansion connector can include parallel bus link such that data can be communicated through expansion connector using parallel multi-drop bus standard simultaneously with switched fabric standard.

While we have shown and described specific embodiments of the present invention, further modifications and improvements will occur to those skilled in the art. It is therefore, to be understood that appended claims are intended to cover all such modifications and changes as fall within the true spirit and scope of the invention.

The invention claimed is:

1. A multi-service platform system, comprising:
a switched fabric backplane;
a baseboard coupled to interface with the switched fabric backplane;
a full-span switched fabric carrier module coupled to interface with the baseboard, wherein the full-span switched fabric carrier module has substantially the same form factor as the baseboard;
a switched fabric link, wherein the full-span switched fabric carrier module interfaces with the baseboard via the switched fabric link; and
a switched fabric enabled mezzanine card coupled to the full-span switched fabric carrier module, wherein the switched fabric enabled mezzanine card is coupled to directly communicate with the multi-service platform system using the switched fabric link via the baseboard without communicating with the baseboard or the full-span switched fabric carrier module.

2. The multi-service platform system of claim 1, wherein the switched fabric link transfers data at least one gigabyte per second.

3. The method of claim 1, the switched fabric link operates using one of InfiniBand, Serial RapidIO, Fibre-Channel, Ethernet, PCI Express, Universal Serial Bus, Serial ATA, Serial Attached SCSI switched fabric standards.

4. The multi-service platform system of claim 1, wherein the switched fabric link comprises an expansion connector, and wherein the expansion connector is coupled to communicate data using a switched fabric standard.

5. The multi-service platform system of claim 4, wherein the expansion connector is coupled to communicate data using a parallel multi-drop bus standard simultaneously with the switched fabric standard.

6. The multi-service platform system of claim 1, further comprising a parallel bus link, wherein the full-span switched fabric carrier module interfaces with the baseboard via the parallel bus link, and wherein the switched fabric enabled mezzanine card is coupled to communicate with the multi-service platform system using the parallel bus link via the baseboard.

7. The multi-service platform system of claim 1, further comprising a second full-span switched fabric carrier module coupled to interface with the full-span switched fabric carrier module via a second switched fabric link.

8. A full-span switched fabric carrier module, comprising:
a switched fabric enabled mezzanine card connection site; and
a switched fabric link coupled to the switched fabric enabled mezzanine card connection site, wherein the switched fabric link interfaces the full-span switched fabric carrier module to a baseboard that is coupled to interface with a switched fabric backplane, wherein a switched fabric enabled mezzanine card coupled to the full-span switched fabric carrier module is coupled to directly communicate with the switched fabric backplane using the switched fabric link without communicating with the baseboard or the full-span switched fabric carrier module.

9. The full-span switched fabric carrier module of claim 8, wherein the switched fabric link comprises an expansion connector, and wherein the expansion connector is coupled to communicate data using a switched fabric standard.

10. The full-span switched fabric carrier module of claim 9, wherein the switched fabric connector is coupled to communicate data using a parallel multi-drop bus standard simultaneously with the switched fabric standard.

11. The full-span switched fabric carrier module of claim 8, further comprising a switched fabric enabled mezzanine card coupled to the full-span switched fabric carrier module at the switched fabric enabled mezzanine card connection site, wherein the switched fabric enabled mezzanine card is coupled to communicate with a multi-service platform system using the switched fabric link via the baseboard.

12. The full-span switched fabric carrier module of claim 11, further comprising a parallel bus link, wherein the full-span carrier interfaces with the baseboard via the parallel bus link, and wherein the switched fabric enabled mezzanine card is coupled to communicate with the multi-service platform system using the parallel bus link via the baseboard.

13. The full-span switched fabric carrier module of claim 8, further comprising a second switched fabric link coupled to interface with a second full-span switched fabric carrier module.

14. A method, comprising:
providing a switched fabric backplane in multi-service platform system;
providing a baseboard coupled to interface with the switched fabric backplane;
interfacing a full-span switched fabric carrier module to the baseboard at a switched fabric link, wherein the full-span switched fabric carrier module has substantially the same form factor as the baseboard;
coupling a switched fabric enabled mezzanine card to the full-span switched fabric carrier module; and
the switched fabric enabled mezzanine card directly communicating with the multi-service platform system using the switched fabric link via the baseboard without communicating with the baseboard or the full-span switched fabric carrier module.

15. The method of claim 14, further comprising communicating data through the switched fabric link using a switched fabric standard.

16. The method of claim 14, wherein the switched fabric link comprises an expansion connector, and further comprising communicating data through the expansion connector using a switched fabric standard.

17. The method of claim 16, further comprising communicating data through the expansion connector using a parallel multi-drop bus standard simultaneously with the switched fabric standard.

18. The method of claim 14, further comprising interfacing the full-span switched fabric carrier module to the baseboard at a parallel bus link and the switched fabric enabled mezzanine card communicating with the multi-service platform system using the parallel bus link via the baseboard.

19. The method of claim 14, further comprising interfacing a second full-span switched fabric carrier module to the full-span switched fabric carrier module via a second switched fabric link.

* * * * *